US008648947B2

(12) United States Patent
Sato et al.

(10) Patent No.: US 8,648,947 B2
(45) Date of Patent: Feb. 11, 2014

(54) IMAGE-PICKUP SYSTEM AND METHOD OF CONTROLLING SAME

(75) Inventors: Sho Sato, Kumagaya (JP); Tadao Endo, Honjo (JP); Toshio Kameshima, Kumagaya (JP); Tomoyuki Yagi, Honjo (JP); Katsuro Takenaka, Honjo (JP); Atsushi Iwashita, Honjo (JP)

(73) Assignee: Canon Kabushiki Kaisha, Tokyo (JP)

( * ) Notice: Subject to any disclaimer, the term of this patent is extended or adjusted under 35 U.S.C. 154(b) by 128 days.

(21) Appl. No.: 13/296,468

(22) Filed: Nov. 15, 2011

(65) Prior Publication Data

US 2012/0127353 A1 May 24, 2012

(30) Foreign Application Priority Data

Nov. 22, 2010 (JP) ................................. 2010-260525

(51) Int. Cl.
| | | |
|---|---|---|
| *H04N 3/14* | (2006.01) | |
| *H04N 5/335* | (2011.01) | |
| *H04N 5/235* | (2006.01) | |
| *G03B 7/00* | (2006.01) | |
| *C12Q 1/68* | (2006.01) | |
| *H01J 40/00* | (2006.01) | |
| *H01J 40/14* | (2006.01) | |
| *G01J 1/44* | (2006.01) | |
| *H01L 27/148* | (2006.01) | |

(52) U.S. Cl.
USPC ........... 348/302; 348/303; 348/362; 250/200; 250/206; 257/222

(58) Field of Classification Search
USPC ................. 348/302–310, 362–368, 370, 371; 250/200, 206; 257/53, 215–234
See application file for complete search history.

(56) References Cited

U.S. PATENT DOCUMENTS

| 4,279,487 A * | 7/1981 | Baker et al. .................... 396/432 |
|---|---|---|
| 4,717,935 A * | 1/1988 | Anacreon ....................... 396/161 |
| 4,748,648 A * | 5/1988 | Boucle et al. ................... 378/97 |
| 5,744,807 A | 4/1998 | Weisfield |
| 6,094,473 A * | 7/2000 | Yu ................................. 378/108 |
| 6,359,651 B1 * | 3/2002 | Yokonuma ..................... 348/370 |
| 6,658,203 B1 * | 12/2003 | Oster et al. ..................... 386/227 |
| 7,176,970 B2 * | 2/2007 | Lee et al. ........................ 348/297 |

(Continued)

FOREIGN PATENT DOCUMENTS

| CN | 101137018 A | 3/2008 |
|---|---|---|
| JP | 0534586 A | 2/1993 |
| JP | 2009219538 A | 10/2009 |
| WO | 2010150569 A1 | 12/2010 |

*Primary Examiner* — Chia-Wei A Chen
(74) *Attorney, Agent, or Firm* — Canon U.S.A., Inc. IP Division

(57) ABSTRACT

An image-pickup apparatus including a detector comprising a detecting unit and a reading circuit, the detecting unit including pixels, each of which including a conversion element, the reading circuit which includes a connecting unit that is electrically connected to a signal wire transferring an electric signal and that electrically connects the signal wire to a node, and which performs a reading operation to output the electric signal from the pixel. A control unit controls an operation of the reading circuit, and a sensing unit senses the end of radiation irradiation based on an output of the reading circuit, which is acquired during the period of an accumulation operation of the detector. The control unit starts establishing the electrical connection between the signal wire and the node through the connecting unit based on the sensed irradiation end, and retains the electrical connection until the start of the reading operation.

12 Claims, 7 Drawing Sheets

(56) References Cited

U.S. PATENT DOCUMENTS

| | | | |
|---|---|---|---|
| 2003/0058360 A1* | 3/2003 | Liu et al. | 348/308 |
| 2004/0233323 A1* | 11/2004 | Wang | 348/371 |
| 2008/0055454 A1* | 3/2008 | Yumiki | 348/333.12 |
| 2008/0136953 A1* | 6/2008 | Barnea et al. | 348/308 |
| 2008/0284874 A1* | 11/2008 | Odaka | 348/229.1 |
| 2009/0052878 A1* | 2/2009 | Warpakowski Furlan | 396/6 |
| 2009/0184253 A1 | 7/2009 | Adachi | |
| 2009/0219425 A1* | 9/2009 | Kobayashi et al. | 348/306 |
| 2010/0165179 A1* | 7/2010 | Kawamura | 348/371 |
| 2010/0329657 A1* | 12/2010 | Hosoi et al. | 396/169 |
| 2011/0128436 A1* | 6/2011 | Ohsuga et al. | 348/371 |
| 2011/0187920 A1* | 8/2011 | Shimada et al. | 348/371 |
| 2012/0126097 A1 | 5/2012 | Kishi | |

\* cited by examiner

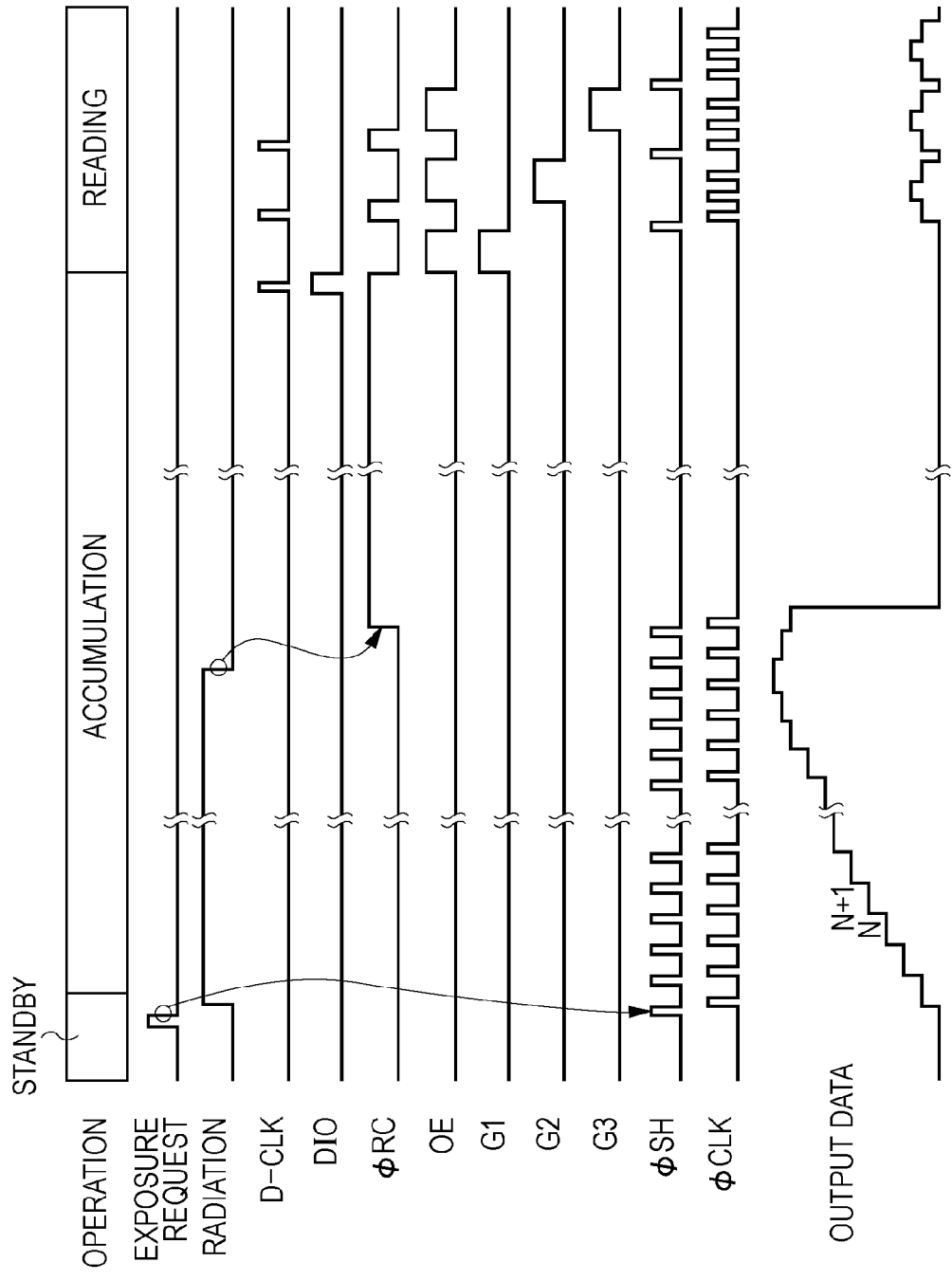

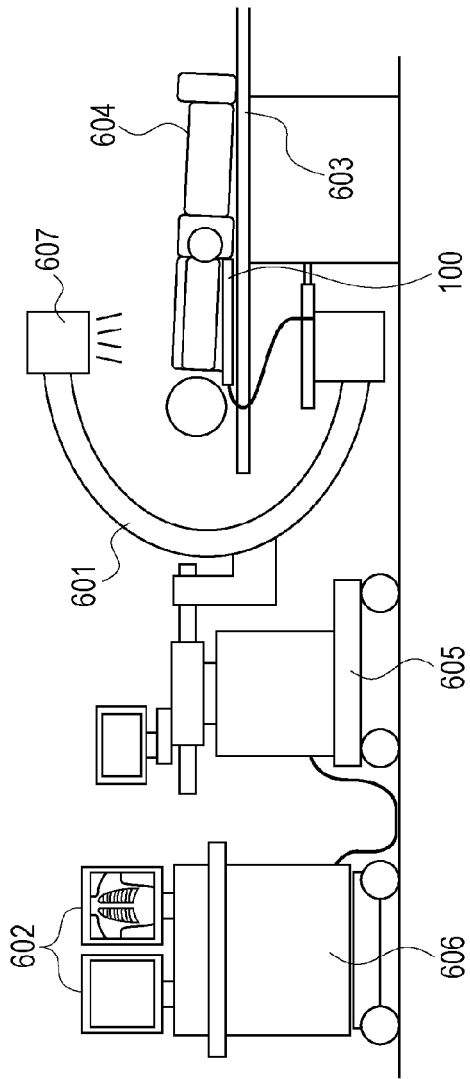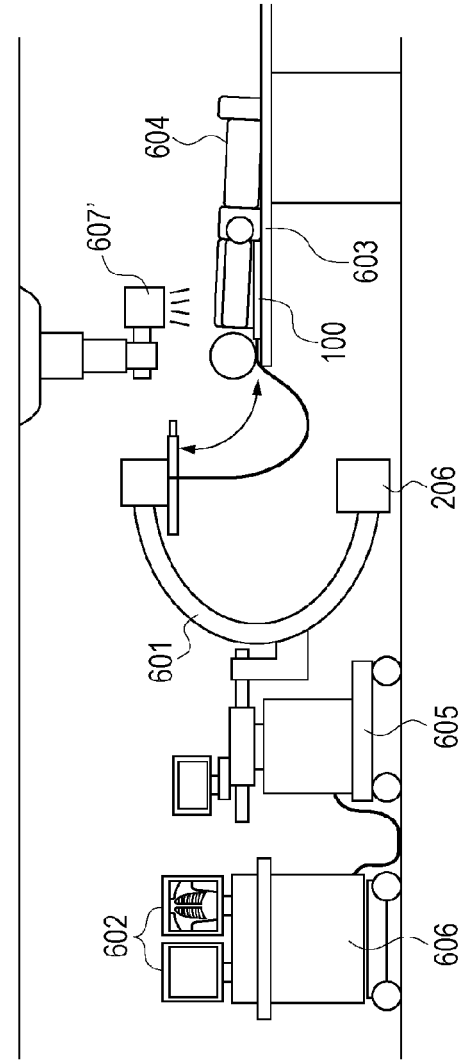

IMAGE-PICKUP SYSTEM AND METHOD OF CONTROLLING SAME

BACKGROUND OF THE INVENTION

1. Field of the Invention

The present invention relates to an image-pickup system equipped with a radiation image-pickup apparatus, a controlling method therefor, and a computer-readable storage medium storing thereon program instructions. The image-pickup system equipped with the radiation image-pickup apparatus may be used for still-image shooting or video shooting such as fluoroscopy.

2. Description of the Related Art

In recent years, image-pickup apparatuses including a flat panel detector (hereinafter abbreviated as an FPD) formed by using a semiconductor material have been commercialized as image-pickup apparatuses that are used to perform a medical image diagnosis or nondestructive testing by using X-rays. The FPD includes two-dimensionally arranged pixels, each of which having a conversion element including a semiconductor material such as a-Si that can convert a radiation into an electric charge and a switching element transferring the electric signal corresponding to the electric charge. The image-pickup apparatus including the FPD is used as a digital image-pickup apparatus performing the still-image shooting such as the general shooting or the video shooting such as the fluoroscopy for performing the medical image diagnosis, for example.

The above-described image-pickup apparatus includes the FPD, a driving circuit driving the switching element, and a reading circuit which outputs the electric signal output from the switching element as image data. A plurality of the switching elements arranged in the row direction are electrically connected to one another via address lines (driving wires) and a plurality of the switching elements arranged in the column direction are electrically connected to one another via data lines (signal wires). The electric signals output from the switching elements are transferred to the reading circuit via the data lines and output from the reading circuit as the image data.

Cross talk is one of the factors responsible for degrading the quality of an image acquired through the image-pickup apparatus. Cross talk occurring in the image-pickup apparatus denotes the influence of an electric signal output from a given pixel, which is exerted on an electric signal output from another pixel. One of the factors responsible for causing cross talk is capacitive coupling occurring between the data line and the electrode of the conversion element in each pixel.

Particularly in radiography, there is radiation that reaches the FPD after passing through a subject or the light corresponding thereto and radiation that reaches the FPD without passing through the subject or light corresponding thereto. An output of a pixel irradiated with the radiation that had reached the FPD without passing through the subject or the light corresponding thereto has a large value. Cross talk occurring during the radiography denotes the influence of the output having the large value, which is exerted on an output of a pixel irradiated with the radiation that had reached the FPD after passing through the subject or the light corresponding thereto. Therefore, the above-described cross talk becomes a significant problem for the image-pickup apparatus used for radiography. For the above-described cross talk, U.S. Pat. No. 5,744,807 discloses a technique for reducing cross talk by connecting a data line to a fixed potential during the radiation-irradiation period and eliminating an induced charge generated by capacitive coupling.

However, the technology disclosed in U.S. Pat. No. 5,744,807 is often inadequate to reduce cross talk. Particularly, U.S. Pat. No. 5,744,807 describes no measures against cross talk occurring in the period from when the connection between the data line and the fixed potential is finished by finishing the radiation irradiation until an operation is started to read the electric charge of a pixel. Particularly when the period is long, the cross talk may be increased based on a time constant determined based on the capacitive or capacitance coupling of the data line and the wiring resistance, and the effect of the technology may become insufficient.

Particularly in an image-pickup apparatus used for radiation imaging (radiography), the accumulation-operation period where each of the switching elements provided in effective pixels becomes non-conductive is determined in advance, and the irradiation of radiation having a dose appropriate for the radiography is performed during a certain period included in the accumulation-operation period. Therefore, the duration between the end of the radiation irradiation and the start of conduction of the first switch element, which is the end of the accumulation-operation period, may be increased depending on the conditions of the radiation irradiation. In that case, the cross talk may be significantly increased.

SUMMARY OF THE INVENTION

Embodiments of the present invention are directed to an image-pickup apparatus that can appropriately decrease cross talk. In one aspect, the present invention discloses an image-pickup system including an image-pickup apparatus including a detector comprising a detecting unit and a reading circuit, the detecting unit being provided with pixels that are arranged in matrix-form, where each of the pixels includes a conversion element converting a radiation into an electric charge, the reading circuit including a connecting unit that is electrically connected to a signal wire transferring an electric signal corresponding to the electric charge and that electrically connects the signal wire to a node to which a specified potential is supplied, the reading circuit being provided to perform a reading operation to output the electric signal from the pixel, and a control unit configured to control an operation of the reading circuit, and a sensing unit configured to sense an end of irradiation of a radiation based on an output of the reading circuit, the output being acquired during a time period where the detector performs an accumulation operation, wherein the control unit controls the reading circuit so that the connecting unit starts establishing the electrical connection between the signal wire and the node based on the sensed end of the irradiation, and retains the electrical connection until the start of the reading operation.

Another aspect of the present invention provides a method of controlling an image-pickup system including an image-pickup apparatus including a detector comprising a detecting unit and a reading circuit, the detecting unit being provided with pixels that are arranged in matrix-form, where each of the pixels includes a conversion element converting a radiation into an electric charge, the reading circuit including a connecting unit that is electrically connected to a signal wire transferring an electric signal corresponding to the electric charge and that electrically connects the signal wire to a node to which a specified potential is supplied, the reading circuit being provided to perform a reading operation to output the electric signal from the pixel, and a control unit configured to control an operation of the reading circuit, wherein the method includes the steps of sensing an end of radiation irradiation based on an output of the reading circuit, the output being acquired during a time period where the detector performs an accumulation operation, and starting establishing the electrical connection between the signal wire and the node by the connecting unit based on the sensed end of the irradiation and retaining the electrical connection by the connecting unit until the start of the reading operation.

A further aspect of the present invention is directed to a storage medium that can store and read a program causing a computer to executing control of an image-pickup system including an image-pickup apparatus including a detector comprising a detecting unit and a reading circuit, the detecting unit being provided with pixels that are arranged in matrix-form, where each of the pixels includes a conversion element converting a radiation into an electric charge, the reading circuit including a connecting unit that is electrically connected to a signal wire transferring an electric signal corresponding to the electric charge and that electrically connects the signal wire to a node to which a specified potential is supplied, the reading circuit being provided to perform a reading operation to output the electric signal from the pixel, and a control unit configured to control an operation of the reading circuit, wherein the program causes the computer to execute the steps of sensing an end of radiation irradiation based on an output of the reading circuit, the output being acquired during a time period where the detector performs an accumulation operation, and starting establishing the electrical connection between the signal wire and the node by the connecting unit based on the sensed end of the irradiation and retaining the electrical connection by the connecting unit until the start of the reading operation.

Embodiments of the present invention describe an image-pickup apparatus that can appropriately reduce cross talk. The use of the image-pickup apparatus is particularly advantageous when the off-resistance of the switching element is small and a large leakage-current flows, and when the duration between the end of the radiation irradiation and the start of the reading operation is long.

Further advantages and features of the present invention will become apparent from the following description of exemplary embodiments with reference to the attached drawings.

BRIEF DESCRIPTION OF THE DRAWINGS

FIG. 4 is a timing chart illustrating operations of the image-pickup apparatus of the first embodiment.

FIG. 7A is a schematic diagram of a radiation image-pickup system including an image-pickup apparatus according to an embodiment of the present invention.

FIG. 7B is a schematic diagram of another radiation image-pickup system including an image-pickup apparatus according to an embodiment of the present invention.

DESCRIPTION OF THE EMBODIMENTS

Hereinafter, embodiments of the present invention will be described in detail with reference to the attached drawings. In an embodiment of the present invention, a radiation includes not only a beam constituting particles (including photons) that are emitted due to the radioactive decay, the beam including an $\alpha$ ray, a $\beta$ ray, a $\gamma$ ray, etc., but also a beam having almost the same energy as that of the above-described beam, the beam including an X-ray, a particle beam, a cosmic ray, etc.

First Embodiment

Figure 1:
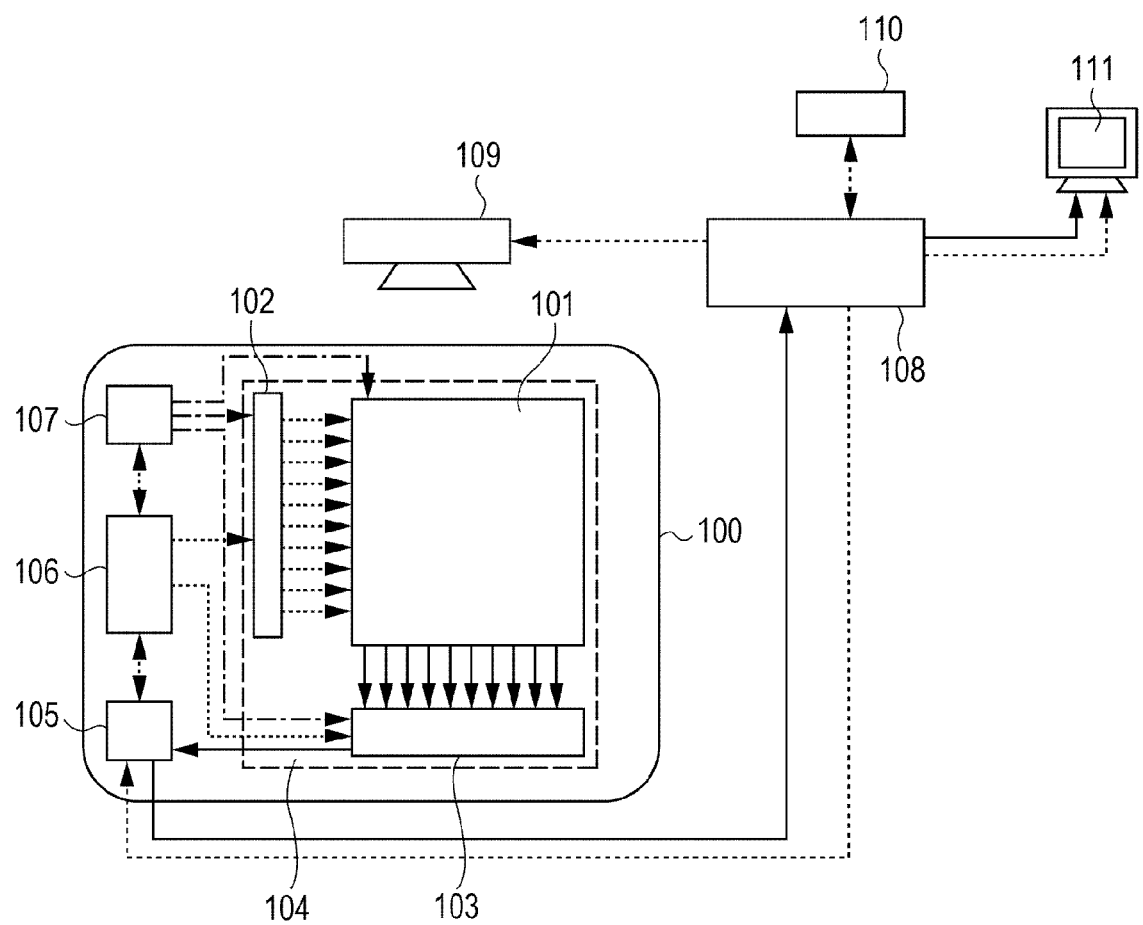
FIG. 1 is a block diagram of an image-pickup system including an image-pickup apparatus according to a first embodiment of the present invention.

An image-pickup system according to an embodiment of the present invention, which is illustrated in FIG. 1, includes an image-pickup apparatus 100, a control computer 108, a radiation generator 109, a console 110, and a display monitor 111. The image-pickup apparatus 100 includes a detector (FPD) 104 having a detecting unit 101 including a plurality of pixels converting radiations into electric signals, a driving circuit 102 driving the detecting unit 101, and a reading circuit 103 outputting the electric signal transmitted from the detecting unit 101 as image data.

The image-pickup apparatus 100 further includes a signal-processing unit 105 which processes and outputs the image data transmitted from the FPD 104, a control unit 106 which controls operations of the FPD 104 by transmitting a control signal to each of the components, and a power-supply unit 107 which supplies a bias to each of the components. The signal-processing unit 105 receives a control signal transmitted from the control computer 108, which will be described later, and transmits the control signal to the control unit 106. Further, the signal-processing unit 105 receives information about the potential of a signal wire, the information being transmitted from the reading circuit 103 during the radiation-irradiation period, and transfers the potential information to the control computer 108.

The power-supply unit 107 includes a power circuit such as a regulator that receives a voltage transmitted from an external power supply or an internal battery (not shown) and that supplies appropriate voltages to the detecting unit 101, the driving circuit 102, and the reading circuit 103. The control computer 108 synchronizes the radiation generator 109 and the image-pickup apparatus 100, transmits a control signal generated to determine the state of the image-pickup apparatus 100, and performs image processing to correct, store, and display image data transmitted from the image-pickup apparatus 100.

Further, the control computer 108 transmits a control signal or an exposure-request signal which determines the radiation-irradiation conditions to the radiation generator 109 based on information transmitted from the console 110. Upon capturing data detected from the reading circuit 103 during the accumulation-operation period, the control computer 108 makes a determination and perform sensing as will be described later based on the captured data, and determines whether or not the radiation irradiation is ended.

The console 110 is provided to input the information of a subject or the data of shooting conditions as parameters used to control the control computer 108 in various ways. The console 110 is also provided to transfer the shooting-condition data and the exposure-request signal to the control computer 108. The display monitor 111 is provided to display image data subjected to the image processing performed by the control computer 108.

Figure 2A:
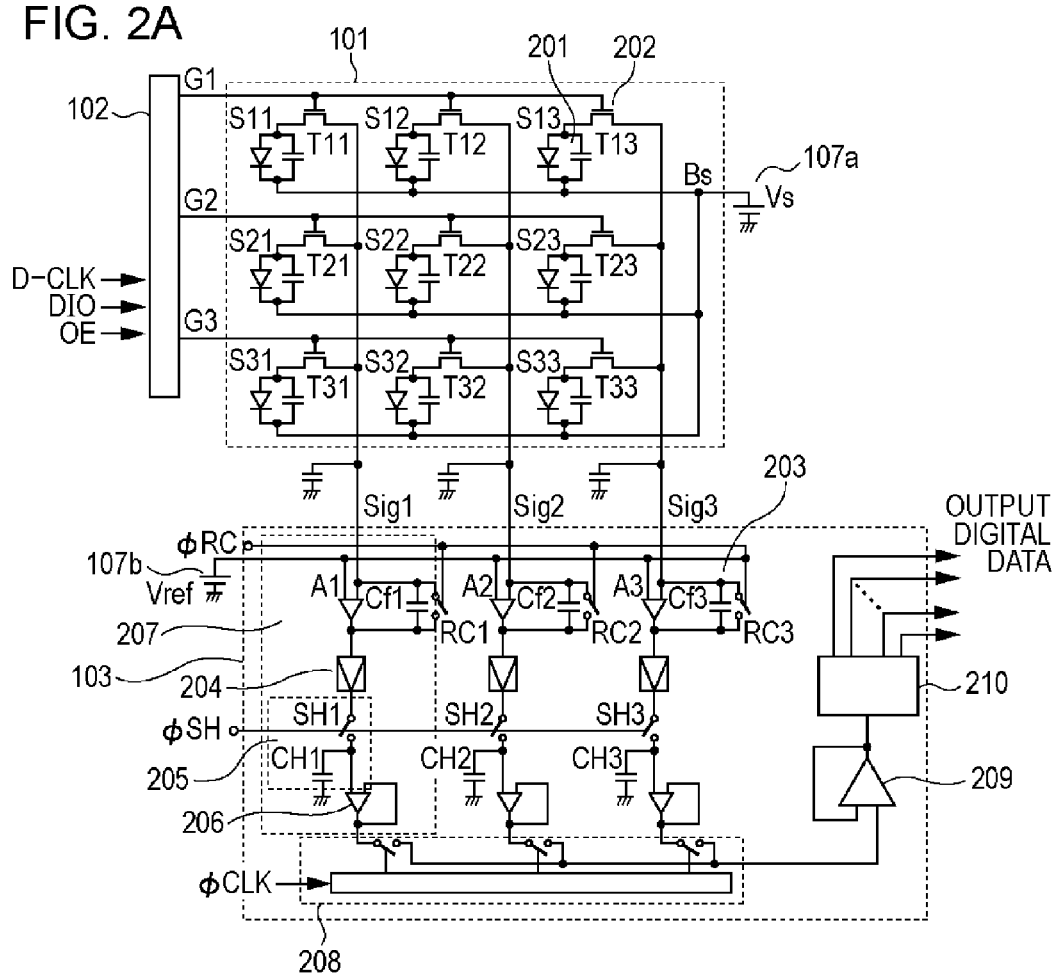
FIG. 2A is an equivalent circuit diagram of the image-pickup apparatus of the first embodiment.

Next, an image-pickup apparatus according to a first embodiment of the present embodiment will be described with reference to FIGS. 2A and 2B. The same components as those illustrated in FIG. 1 are illustrated with the same reference numerals, and the detailed descriptions thereof will not be furnished. In FIG. 2A, the image-pickup apparatus includes an FPD having a 3 by 3 array of pixels for the sake of simplicity. However, an actual image-pickup apparatus includes more pixels. For example, a 17-inch image-pickup apparatus includes an approximately 2800 by 2800 array of pixels.

The detecting unit 101 includes a plurality of pixels arranged in matrix form. In the present embodiment, the pixel includes a conversion element 201 which converts a radiation into an electric charge and a switching element 202 which outputs the electric signal corresponding to the electric charge. In the present embodiment, a metal insulator semiconductor (MIS)-type photosensor that is provided on an insulating substrate such as a glass substrate and that includes amorphous silicon as the main material is used as a photoelectric conversion element which converts light into an electric charge.

As the conversion element, an indirect-type conversion element having a wavelength converter that is provided on the radiation-incident side of the above-described photoelectric conversion element and that converts a radiation into light falling within the band of wavelengths that can be sensed by the photoelectric conversion element, or a direct-type conversion element that directly converts a radiation into an electric charge is appropriately provided. As the switching element 202, a transistor having a control terminal and two main terminals is appropriately provided. In the present embodiment, a thin film transistor (TFT) is provided.

One of the electrodes of the conversion element 201 is electrically connected to one of the two main terminals of the switching element 202, and the other electrode is electrically connected to a bias power supply 107a via common bias wiring Bs. As for a plurality of switching elements arranged in the row direction, for example, switching elements T11, T12, and T13, the control terminals thereof are commonly and electrically connected to a driving wire G1 of the first row. The driving circuit 102 transmits driving signals provided to control the conductive states of the switching elements T11 to T13 in rows via the driving wire G1. As for a plurality of switching elements arranged in the column direction, for example, the switching element T11 and switching elements T21 and T31, the other main terminals thereof are electrically connected to a signal wire Sig1 of the first column. The switching elements T11 to T31 output the electrical signals corresponding to the electric charge of the conversion element 201 to the reading circuit 103 via the signal wire Sig1 while the switching elements T11 to T31 are in the conductive state.

The signal wires Sig1, Sig2, and Sig3 that are arranged in the column direction are provided to transfer electric signals in parallel to the reading circuit 103, the electric signal being output from the plurality of pixels. Although each of the pixels described in the present embodiment includes the conversion element 201 and the switching element 202, another embodiment can also be achieved without being limited to the above-described configuration. Namely, a pixel further including an amplification transistor, at least, between the signal wire Sig or the conversion element 201 and the switching element 202, or a pixel further including an initialization transistor provided to initialize the conversion element 201 or a node provided between the conversion element 201 and the amplification transistor may be provided, which also achieves another embodiment of the present embodiment.

The reading circuit 103 includes a plurality of amplifying circuits 207 amplifying electric signals that are output in parallel from the detecting unit 101, where the amplifying circuits 207 correspond to the respective signal wires. Each of the amplifying circuits 207 includes an integrating amplifier 203 amplifying the output electric signal, a variable amplifier 204 amplifying the electric signal output from the integrating amplifier 203, a sample-and-hold circuit 205 that samples and holds the amplified electric signal, and a buffer amplifier 206.

The integrating amplifier 203 includes an operational amplifier A which amplifies and outputs a read electric signal, an integral capacitance Cf, and a reset switch RC. The integrating amplifier 203 includes a mechanism that can change an amplification factor by changing the value of the integral capacitance Cf. An output electric signal is input to the inverting input terminal of the operational amplifier A, a reference voltage Vref is input from a reference power supply 107b to the non-inverting input terminal of the operational amplifier A, and an amplified electric signal is output from the output terminal of the operational amplifier A. Further, the integral capacitance Cf is provided between the inverting input terminal and the output terminal of the operational amplifier A.

The sample-and-hold circuit 205 is provided for each of the amplifying circuits 207, and includes a sampling switch SH and a sampling capacitance Ch. The reading circuit 103 includes a multiplexer 208 that outputs electric signals that are read in parallel from the amplifying circuits 207 in sequence as serial image signals. The reading circuit 103 further includes a buffer amplifier 209 that performs impedance conversion for the image signals and that outputs the converted image signals.

An image signal Vout, which is an analog electric signal output from the buffer amplifier 209, is converted into digital image data by an A/D converter 210 and is output to the signal-processing unit 105. The digital image data is processed by the signal-processing unit 105 and is output to the control computer 108. The driving circuit 102 outputs a driving signal including a conducting voltage Vcom that causes the switching element to enter the conductive state and a non-conducting voltage Vss that causes the switching element to enter the non-conductive state to each of the driving wires based on control signals (D-CLK, OE, and DIO) that are input from the control unit 106. Thus, the driving circuit 102 controls the conductive state and the non-conductive state of the switching element, and drives the detecting unit 101.

The power-supply unit 107 illustrated in FIG. 1 includes the bias power supply 107a and a reference power supply 107b of the amplifying circuits 207 that are illustrated in FIG. 2A. The bias power supply 107a supplies a bias voltage Vs via bias wiring Bs so that the bias voltage Vs is shared among the other electrodes of the conversion elements. The reference power supply 107b supplies a reference voltage Vref to the forward input terminal of each of the operational amplifiers A.

Upon receiving a control signal transmitted from the control computer 108 or the like provided outside the apparatus via the signal-processing unit 105, the control unit 106 illustrated in FIG. 1 transmits various control signals to the driving circuit 102, the power-supply unit 107, and the reading circuit 103 to control the operation of the FPD 104. The control unit 106 illustrated in FIG. 1 transmits control signals D-CLK, OE, and DIO to the driving circuit 102 illustrated in FIG. 2A to control the operations of the driving circuit 102. Here, the control signal D-CLK is a shift clock of a shift register used as a driving circuit, the control signal DIO is a pulse transferred from the shift register, and the control signal OE is provided to control the output terminal of the shift register.

Further, the control unit 106 transmits control signals ΦRC, ΦSH, and ΦCLK to the reading circuit 103 illustrated in FIG. 2A to control the operations of the components of the reading circuit 103. Here, the control signal ΦRC controls the operation of the reset switch RC of the integrating amplifier 203, the control signal ΦSH controls the operations of the sample-and-hold circuit 205, and the control signal ΦCLK controls the operations of the multiplexer 208.

In radiography, an operator transmits instructions to start shooting to the control computer 108 by operating the console 110. When an exposure-request signal is transferred to the control computer 108, the operation of the image-pickup apparatus 100 is shifted from a standby operation to an accumulation operation. In accordance with the shift to the accumulation operation, the radiation generator 109 irradiates the subject with radiation. During the accumulation-operation period, the non-conducting voltage Vss is transmitted to the switching elements 202 so that the switching element 202 of each pixel is caused to enter the non-conductive state. The radiation irradiation is performed only during an arbitrary period set by the operator operating the console 110, and is ended within the accumulation-operation period.

In ordinary radiography, the accumulation-operation period lasts about one second at the longest. The end of the radiation irradiation is sensed through a sensing operation within the accumulation-operation period, and the control computer 108 transmits a control signal to the control unit 106 to finish the accumulation operation. After the end of the accumulation operation, the image-pickup apparatus 100 is shifted to a reading operation and outputs electric signals from the pixels to output image data. The details of the accumulation operation, the sensing operation, and the reading operation will be described later.

Next, the cross-sectional structure of a single pixel including the conversion element 201 and the switching element 202 according to an embodiment of the present invention will be described with reference to FIG. 2B. A TFT provided as the switching element 202 includes a first conductive layer 211, a first insulating layer 212, a first semiconductor layer 213, a first impurity semiconductor layer 214, and a second conductive layer 215 that are provided on an insulating substrate.

The first conductive layer 211 is used as the control electrode (gate electrode) of the TFT, and the first insulating layer 212 is used as a gate insulating film. The first semiconductor layer 213 is used as the channel of the TFT, the first impurity semiconductor layer 214 is used as an ohmic contact layer, and the second conductive layer 215 is used as a first or second main electrode (source or drain electrode). A second insulating layer 216 is provided on the above-described layers as an interlayer insulating layer.

Here, the second insulating layer 216 includes an organic insulating film or an inorganic insulating film, or the laminated structure thereof as appropriate. Particularly, the laminated structure of an inorganic insulating film provided as passivation covering the TFT and an organic insulating film provided as a planarizing film can be used. The photoelectric conversion element 201 is provided on the second insulating film 216.

A photoelectric conversion element S includes a third conductive layer 217, a third insulating layer 218, a second semiconductor layer 219, a second impurity semiconductor layer 220, and a fifth conductive layer 222. The third conductive layer 217 is used as a lower electrode (one electrode) of the photoelectric conversion element S, and the third insulating film 218 is used as a perfect insulating layer blocking the transfer of generated positive and negative carriers, and the second semiconductor layer 219 is used as a photoelectric conversion layer converting a radiation or light into an electric charge.

Further, the second impurity semiconductor layer 220 is used as a blocking layer blocking the transfer of positive or negative carriers, the fifth conductive layer 222 is used as an upper electrode (the other electrode). Further, a fourth conductive layer 221 is used as the bias wiring Bs. The upper electrode (the other electrode) is used as an electrode applying a bias to the entire photoelectric conversion element S, where the bias is the potential difference between a bias potential Vs or an initialization potential Vr supplied from the bias wiring Bs and the reference potential Vref supplied to the lower electrode.

Thus, the conversion element 201 is provided on the switching element 202 provided on the insulating substrate, and a fourth insulating layer 223 is provided on the conversion element 201 as passivation and a planarizing layer as is the case with the second insulating layer 216 to achieve a single pixel. A wavelength converter 224 is provided above the photoelectric conversion element S. The wavelength converter 224 converts an applied radiation into visible light falling within the band of wavelengths that can be sensed by the photoelectric conversion element S. The wavelength converter 224 is provided on the surface of the fourth insulating layer 223 by evaporation, or adhered to the surface of the fourth insulating layer 223 with an adhesive or the like.

Figure 3A:
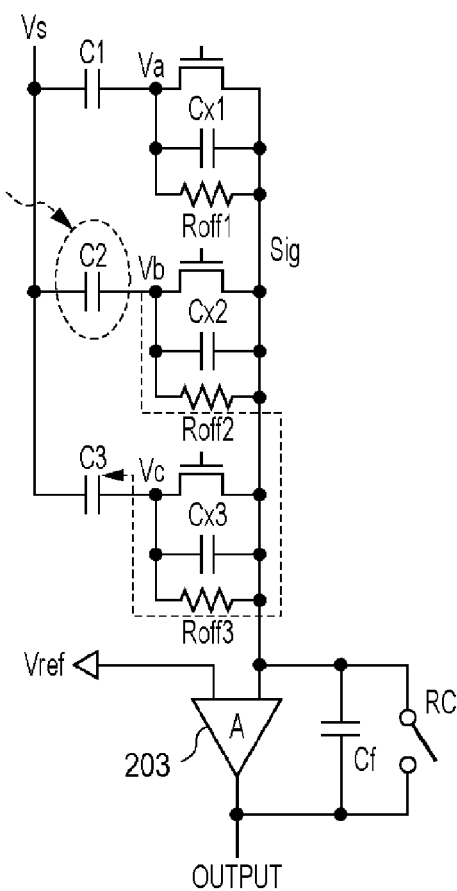
FIG. 3A is an equivalent circuit diagram of the mechanism of a conventional group of pixels.
Figure 3B:
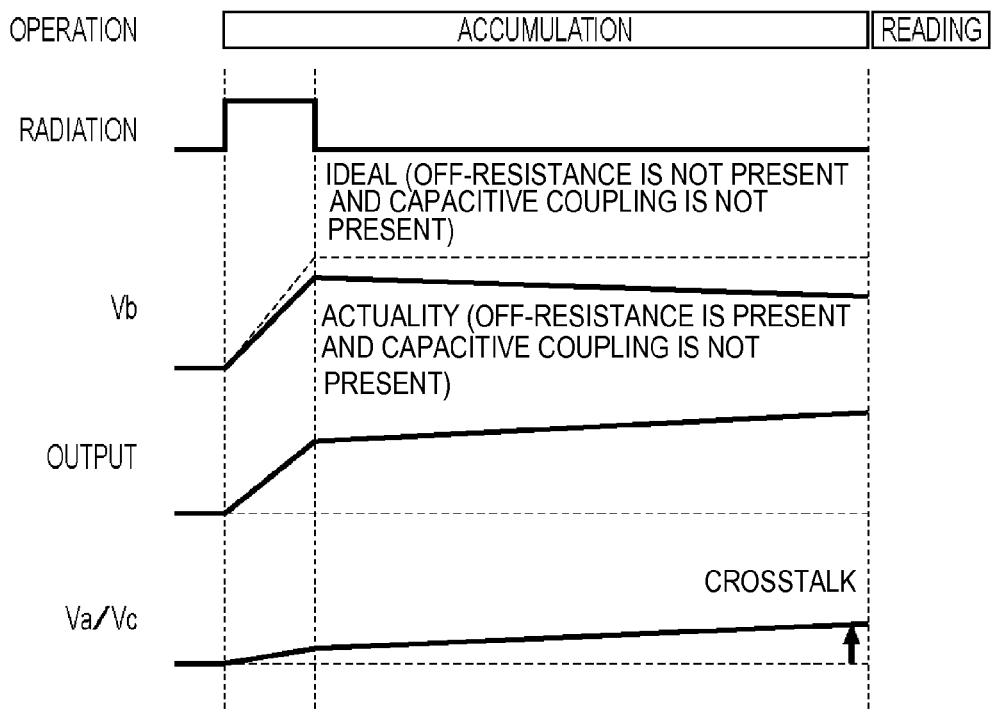
FIG. 3B illustrates the capacitive coupling characteristics of the conventional group of pixels.

Next, the mechanism of cross talk will be described with reference to FIGS. 3A and 3B. FIG. 3A illustrates part of the simplified detecting unit 101 including a 3 by 1 array of pixels and the simplified reading circuit 103. In each of the pixels provided in the detecting unit 101, capacitive coupling represented by a coupling capacitor Cx is present between the lower electrode of the conversion element 201 and the signal wire Sig as illustrated in FIG. 3A.

Figure 2B:
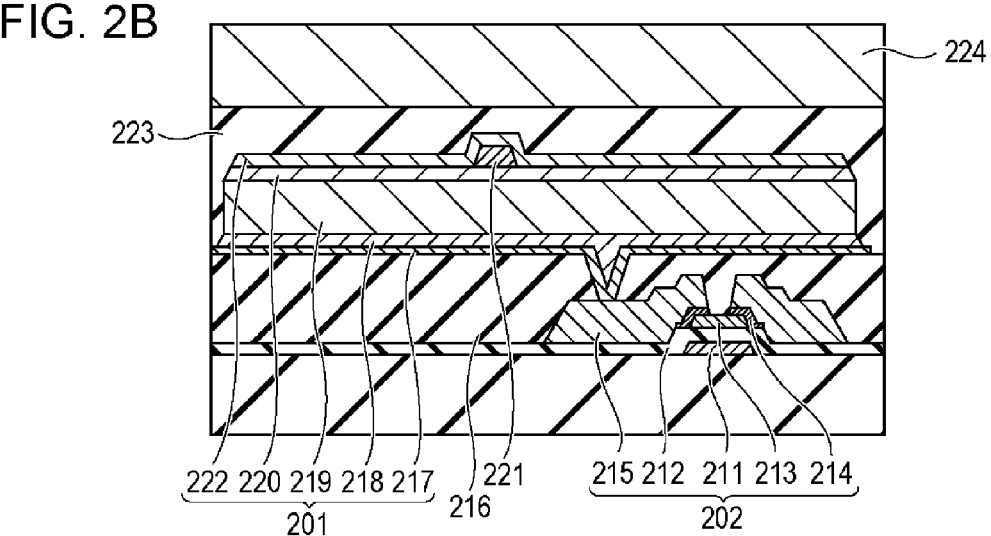
FIG. 2B is a cross-sectional view of a single pixel.

Particularly when the conversion element 201 is provided on the switching element 202 as illustrated in FIG. 2B, the capacitive coupling represented by the coupling capacitor Cx becomes significant. Further, an off-resistance Roff is present when the switching element is in the non-conductive state. A cross talk is induced during the accumulation operation due to the coupling capacitor Cx and the off-resistance Roff.

FIG. 3A illustrates capacitance components C1, C2, and C3 of the conversion element 201. Here, a pixel to which a high input is supplied during radiography, for example, a pixel provided in an area irradiated with radiation that had reached the FPD without passing through the subject or the light corresponding thereto is expressed as C2. Further, pixels to which low inputs are supplied (e.g., pixels provided in an area irradiated with radiation that had reached the FPD after passing through the subject or the light corresponding thereto) are expressed as C1 and C3.

According to an embodiment of the present invention, a leakage-current flowing due to the off-resistance of the switching element and the coupling capacitance become the cause of a cross talk occurring via a signal line. First, when the radiation irradiation is started, the electric charges corresponding to the radiation intensity are accumulated in the pixel C2 through the photoelectric conversion. Accordingly, a potential Vb (the potential of the lower electrode of the conversion element) illustrated in FIG. 3A is gradually increased. At that time, potentials Va and Vc of the lower electrodes of the pixels C1 and C3, which are achieved via the coupling capacities Cx, are increased in accordance with a time constant determined based on the coupling capacitance and the parasitic resistance of the signal wire, and electric charges are accumulated in the pixels C1 and C3, and become a cross talk.

Here, when the off-resistance of the switching element is unlimited and no leakage-current flows, no more change occurs even though the potential Vb is increased. In actuality, however, the off-resistance of the switching element is limited and a leakage-current occurs via an off-resistance Roff2 with an increase in the potential Vb. Therefore, the potentials Va and Vc of the lower electrodes of the pixels C1 and C3 are further increased in accordance with a time constant determined based on the coupling capacitance, the parasitic resistance of the signal wire, and the off resistance.

Although the signal wire is connected to a fixed potential during the accumulation-operation period, the potential increase occurs after the connection is finished and the radiation irradiation is ended. The potential increase is continued from the end of the radiation irradiation, and the end of the connection between the signal wire and the fixed potential until the start of the reading operation. Thus, the present inventors experimentally found that the cross talk is increased in accordance with the inputting of radiation to the pixel C2 illustrated in FIG. 3A and the time consumed from the end of the radiation irradiation until the start of the reading operation, and established the above-described mechanism.

In the present embodiment, therefore, the end of the radiation irradiation is sensed through the sensing operation performed during the accumulation-operation period. Immediately after the end of the radiation irradiation is sensed, control is performed to couple the signal wire Sig to a node provided in the reading circuit 103, to which a fixed potential is supplied based on the control signal DRC. The details of the sensing operation will be described later.

Hereinafter, operations of the image-pickup apparatus 100 of the present embodiment will be described with reference to FIGS. 1 to 4. When the exposure-request signal is transferred to the control computer 108, the image-pickup apparatus 100 is shifted to the accumulation operation and the radiation generator 110 irradiates the subject with radiation as described above. Then, the radiation irradiation is monitored through the sensing operation performed by the reading circuit 103, and the end of the radiation irradiation is sensed through the sensing operation. Here, the accumulation operation denotes an operation performed by the detector 104 to cause each of the switching elements that are provided in an area provided to acquire radiograph data of the detecting unit 101 to enter the non-conductive state to attain the state where electric charges that are generated in the conversion element can be accumulated. The accumulation-operation period denotes the period where the accumulation operation is performed.

The sensing operation denotes an operation performed by the control unit 106 to cause the reading circuit 103 to perform the following operation to acquire a sensing-output signal or output data during the accumulation-operation period. Upon receiving a control signal generated in response to the exposure-request signal transmitted from the control computer 108, the control unit 106 transmits a control signal to the reading circuit 103 in response thereto. The reading circuit 103 performs the following operations based on the control signal.

First, the control unit 106 transmits the control signal ΦSH to the sample-and-hold circuit 205, and samples and temporarily holds a signal output from the integrating amplifier 203. The above-described operations are referred to as a sample-and-hold operation. Next, the control unit 106 transmits the control signal ΦCLK to the multiplexer 208, and the output signal held in the sample-and-hold circuit 205 is output to the A/D converter 210 and output from the A/D converter 210 to the control computer 108 as output data. The above-described operations are referred to as an output operation.

The control unit 106 transmits the control signals ΦSH and ΦCLK to the reading circuit 103 at desired intervals so that the sample-and-hold operation and the output operation are performed a plurality of times at predetermined intervals during the accumulation-operation period. While the sample-and-hold operation and the output operation are performed the plurality of times, the reset switch RC of the integrating amplifier 203 is retained in the non-conductive state. While the detecting unit 101 is irradiated with radiation, the output data is increased in accordance with the amount of charge accumulated in the pixels based on the radiation-irradiation quantity, because the volume (value) of signals output from the integrating amplifier 203 is increased due to the coupling capacitance Cx. When the radiation irradiation is ended, the number of the output signals stops increasing and subsequently falls. This is because the output signals of the integrating amplifier 203 are output via a subsequent capacitance component such as a sample-and-hold capacity Ch.

The control computer 108 includes a sensing unit provided to sense the end of the radiation irradiation based on the output data corresponding to the output signals. In the sensing unit, two consecutive output-data items of output-data items that are acquired through the sample-and-hold operation and the output operation that are performed a plurality of times consecutively during the accumulation-operation period are compared to each other. When the value of an output signal acquired later than the other and the output data corresponding thereto is larger than that of an output signal acquired earlier and the output data corresponding thereto, the sensing unit determines that the radiation irradiation is continued. On the other hand, when the value of the output signal acquired later and the corresponding data is not greater than that of the output signal acquired earlier and the corresponding output data, the sensing unit determines that the radiation irradiation is ended.

When the sensing unit senses the end of the radiation irradiation, the control computer 108 transmits a control signal to the control unit 106, and the control unit 106 transmits the control signal ΦRC to the integrating amplifier 203 of the reading circuit 103 in response thereto. Consequently, the reset switch RC of the integrating amplifier 203 is caused to enter the conductive state, the integral capacitance Cf is reset, and the signal wire Sig is electrically connected to a node supplied with a fixed predetermined potential.

Namely, the control unit 106 causes the reset switch RC to enter the conductive state based on the end of the irradiation of radiation or light, which is sensed by the sensing unit. Consequently, the electrical connection between the signal wire Sig and the node supplied with the predetermined potential is started, and the signal wire Sig is reset accordingly. The above-described operations are referred to as a reset operation. The reset operation is started in response to the sensing of the end of the radiation irradiation, and is continued over a desired period until the start of the reading operation. Namely, the conductive state of the reset switch RC is started in response to the end of the irradiation, the end being sensed by the sensing unit, and continued until the start of the reading operation causing the driving circuit 102 to start driving the detecting unit 101.

Accordingly, the time period where the signal wire is not connected to the fixed potential, the time period being included in the duration between the end of the radiation exposure and the start of the reading operation, can be reduced to appropriately suppress a cross talk occurring in the period. Here, the time period where the conductive state of the reset switch RC is retained may be the same as that where the resetting is performed during the reading operation which will be described later. However, the former time period can be longer than the latter time period.

Usually, during the reading operation, the conductive state of the reset switch RC is retained over a time period of about 10 μs. However, during the reset operation, the reset switch RC can be retained in the conductive state over a time period which is about five to ten thousand times as long as the above-described time period. When the conductive state of the reset switch RC is retained over such a long time period, a cross talk can be appropriately reduced. When the accumulation-operation period is determined in advance, the time period where the conductive state of the reset switch RC is continued may be controlled in synchronization with the end of the accumulation-operation period. Further, when the time period where the conductive state of the reset switch RC is continued is the same as that where the resetting is performed during the reading operation, control can be performed so that the reading operation is started immediately after the conductive state of the reset switch RC is finished.

In the present embodiment, the reset operation performed by using the reset switch RC of the integrating amplifier 203 is described. However, another embodiment of the present invention may be achieved without being limited to the above-described configuration. For example, a switch that can connect a power supply capable of supplying a fixed potential to the signal wire Sig, or a switch that can connect a node supplied with the reference voltage Vref or a ground potential to the signal wire Sig in synchronization with the reset switch RC may be used. The above-described switches, the reset switch RC, and a set of those switches correspond to a connecting unit according to an embodiment of the present invention.

Next, the operation is shifted to the reading operation. The reading operation denotes an operation performed by the reading circuit 103 to output the electric signal corresponding to an electric charge generated in the conversion element 201 from the pixel as image data. In the present embodiment, the reading operation is started due to the start of the driving of the detecting unit 101, which is performed by the driving circuit 102.

When the reset switch RC is caused to enter the non-conductive state, the control unit 106 transmits the control signals D-CLK, DIO, and OE to the driving circuit 102 so that the driving circuit 102 starts driving the detecting unit 101 as shown in FIG. 4. Accordingly, at the beginning of the reading operation, the driving circuit 102 transmits the conducting voltage Vcom to the driving wiring G1 to cause the switching elements T11 to T13 of the first row to enter the conductive state.

Accordingly, electric signals generated based on electric charges generated through the conversion elements S11 to S13 of the first row are output to the signal wires. The electric signals that are output in parallel via the signal wires are amplified by the integrating amplifiers 203 and the variable amplifiers 204 of the respective amplifying circuits 207. The amplified electric signals are held in parallel in the sample-and-hold circuits 205 that are provided in the respective amplifying circuits 207, the sample-and-hold circuits 205 being operated based on the control signal ΦSH.

After the electric signals are held, the integrating capacities Cf and the signal wires Sigs are reset. After the resetting, the conducting voltage Vcom is supplied to a driving wire G2 of the second row as is the case with the first row, and the switching elements T21 to T23 of the second row are caused to enter the conductive state. During the time period where the switching elements T21 to T23 of the second row are in the conductive state, the multiplexer 208 outputs the electric signals that are held in the sample-and-hold circuit 205 in sequence.

Accordingly, the electric signals that are read in parallel from the pixels of the first row are converted into serial image signals and output. The A/D converter 210 converts the serial image signals into the image data corresponding to a single row and outputs the image data. The above-described operations are performed for each of the first to third rows so that the radiograph data corresponding to a single frame is output from the image-pickup apparatus 100.

The above-described operations of the image-pickup apparatus 100 allow for reducing the time period where the signal wire is not connected to the fixed potential, the time period being included in the duration between the end of the radiation exposure and the start of the reading operation, and suppressing a cross talk occurring in the time period. The above-described advantage becomes significant through the use of the FPD 104 where the off-resistances of the switching elements 202 are small and large leakage-currents flow. Further, the above-described advantage also becomes significant when the duration between the end of the radiation irradiation and the start of the reading operation is long.

In the present embodiment, the intervals at which the sample-and-hold operation and the output operation are performed during the sensing operation can be shorter than those at which the sample-and-hold circuit 205 and the multiplexer 208 perform operations during the reading operation. This is because the end of the radiation exposure can be sensed with increased precision. In ordinary radiography, the radiation irradiation is performed for a few msec to a few hundred msec. During the sensing operation, the sample-and-hold operation and the output operation can be performed at intervals of about one hundredth of the irradiation time. Accordingly, 0.1 MHz or around (intervals of about 10 μsec) is sufficient.

Further, the control computer 108 may change the intervals at which the sample-and-hold operation and the output operation are performed based on the radiation-irradiation time set by the operator through the console 110 illustrated in FIG. 1. For example, when the irradiation time is determined to be 10 msec through the console 110, the control computer 108 transfers a signal to the control unit 106 to execute the sample-and-hold operation and the output operation at 10 kHz. Further, when the irradiation time is determined to be 100 msec through the console 110, the control computer 108 transfers a signal to the control unit 106 to execute the sample-and-hold operation and the output operation at 1 kHz.

In the present embodiment, the output operation performed during the sensing operation is equivalent to the parallel-to-serial conversion operation performed by the multiplexer 208 during the reading operation. However, another embodiment of the present invention may be achieved without being limited to the above-described configuration. During the output operation, a plurality of the sample-and-hold circuits 205 can be selected within the same time period so that the multiplexer 208 outputs signals output from the sample-and-hold circuits in the same time period, which is effective to reduce the intervals at which the output operation is performed. In that case, the amplification factor of at least one of the integrating amplifier 203 and the variable amplifier 204 can be changed based on the number of the selected sample-and-hold circuits 205, so as not to cause the output signals to exceed the dynamic range of the A/D converter 210.

Further, during the output operation, the multiplexer 208 can select only a specified sample-and-hold circuit 205, which is also effective to reduce the intervals at which the output operation is performed. In that case, the selected specified sample-and-hold circuit 205 can be provided for the pixel array corresponding to ten percent or fewer of all of the pixel arrays of the detecting unit 101, where the ten percent-or-fewer pixel array is arranged on one end part of an area including all of the pixel arrays, because the ten percent-or-fewer pixel array arranged on the one end part is often irradiated with a radiation that had not passed through the subject and the values of signals output from the ten percent-or-fewer pixel array are increased. Consequently, the end of the radiation exposure can be sensed with increased precision.

Further, even though the sensing unit determines and senses the end of the radiation exposure based on the output data in the present embodiment, another embodiment of the present invention may be achieved without being limited to the above-described configuration. The sensing unit may be provided between the sample-and-hold circuit 205 and the A/D converter 210 and determine the end of the radiation exposure based on a signal output from the sample-and-hold circuit 205. Namely, the sensing unit may be provided in any manner on condition that the sensing unit senses the end of the irradiation of radiation or light based on an output from the reading circuit 103 during the accumulation-operation period.

As for the reading circuit 103, an A/D converter including a reset switch may be provided in place of the integrating amplifier 203, a memory may be provided in place of the sample-and-hold circuit 205, a digital multiplexer may be provided in place of the multiplexer 208, and the A/D converter 210 may be eliminated. In that case, the sampling operation becomes the temporal storing and holding of digital data, which are performed by the memory, and the output operation becomes digital parallel-to-serial conversion processing performed for the digital data output from the memory via the digital multiplexer.

Further, even though the sensing operation is performed through the reading circuit 103 in the present embodiment, another embodiment of the present invention may be achieved without being limited to the above-described configuration. Namely, another reading circuit may be provided to perform the sensing operation.

Further, the control computer 108 can include a storage unit storing the data of the radiation-exposure start time, the radiation-exposure end time sensed in the present embodiment, and the reading-operation start time. An offset-acquisition operation is performed to acquire offset-correction image data from the FPD 104 based on the time data stored in the storage unit. According to the offset-acquisition operation, the accumulation operation and the reading operation are performed, excluding the radiation irradiation and the sensing operation, to acquire the offset-correction image data.

Consequently, the radiograph data and the offset-correction image data can be acquired through the accumulation operations that are performed over the same time period, and the precision of an offset correction made by subtracting the offset-correction image data from the radiograph data is increased. The above-described time data may be used to perform an operation to acquire gain-correction image data. That is, an operation can be performed to acquire correction-image data provided to correct the radiograph data acquired from the FPD 104.

Second Embodiment

Figure 5A:
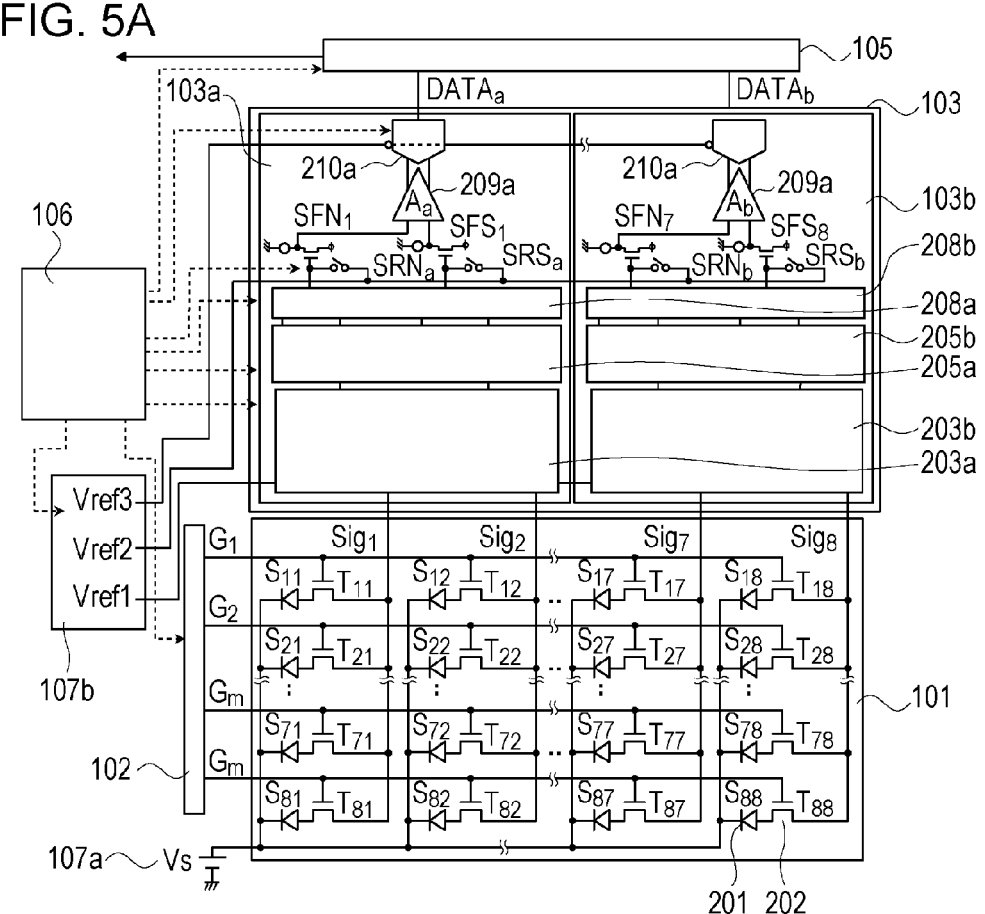
FIG. 5A is an equivalent circuit diagram of an image-pickup apparatus according to a second embodiment of the present invention.
Figure 5B:
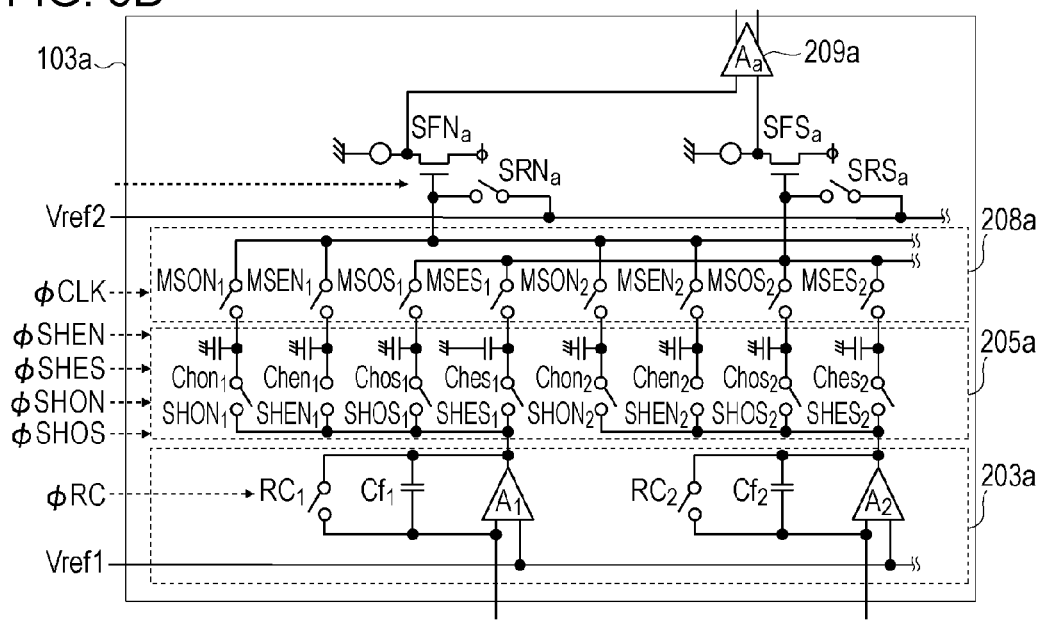
FIG. 5B is another equivalent circuit diagram of the image-pickup apparatus of the second embodiment.
Figure 6:
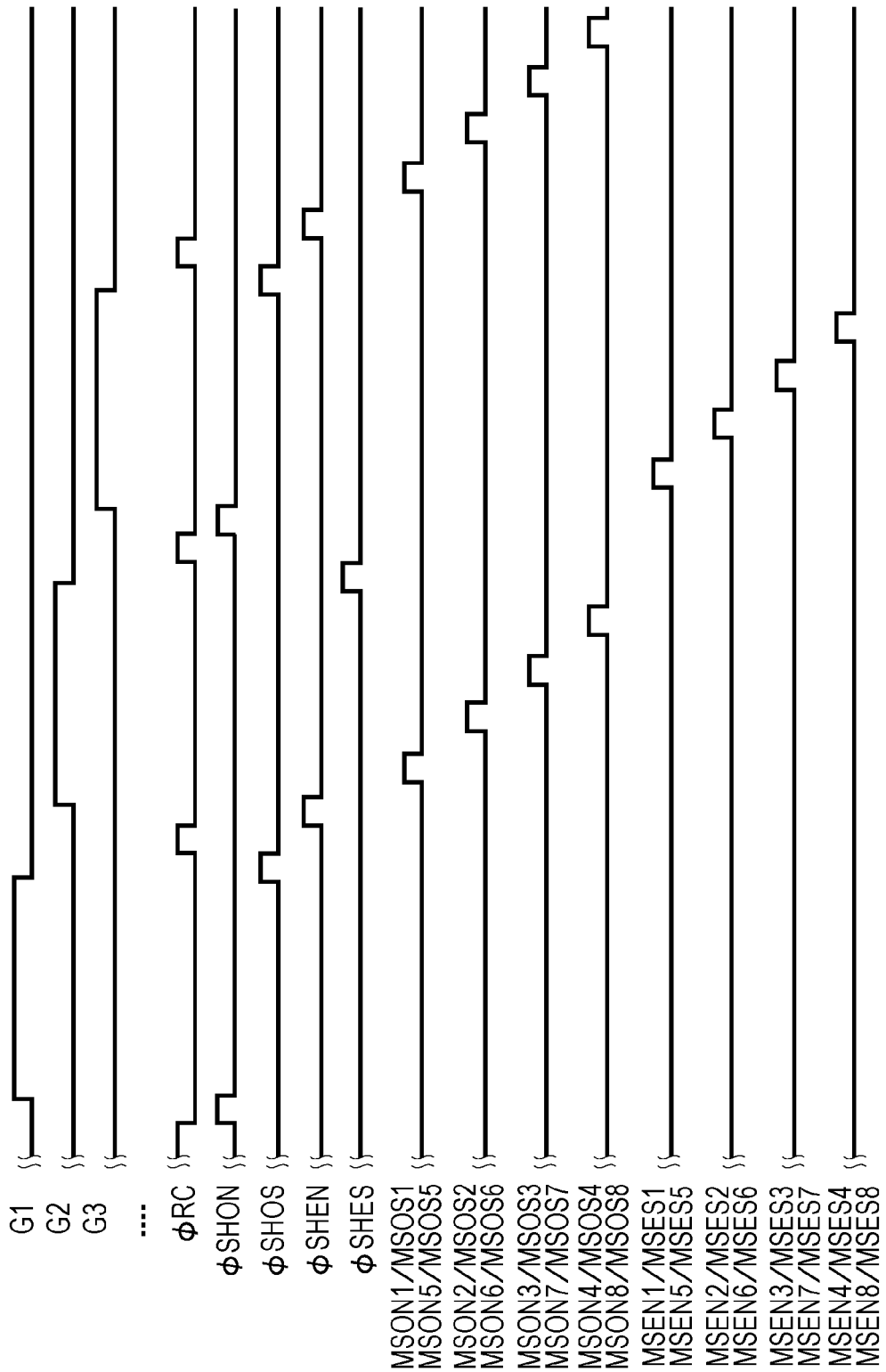
FIG. 6 is a timing chart illustrating operations of the image-pickup apparatus of the second embodiment.

Next, a second embodiment of the present invention will be described with reference to FIGS. 5A, 5B, and 6. The same components as those of the first embodiment will be illustrated with the same reference numerals, and the detailed descriptions thereof will not be furnished. Hereinafter, the differences between the present embodiment and the first embodiment will be described.

Firstly, in the present embodiment, a conversion element 201' which is a positive intrinsic negative (PIN)-type photodiode is provided in place of the MIS-type photosensor. Secondly, the reading circuit 103 includes a plurality of reading-circuit units including a first reading-circuit unit 103a and a second reading-circuit unit 103b. In that case, the detecting unit 101 is divided into a plurality of pixel groups, and a single reading-circuit unit is provided for a single pixel group. The second difference allows for the plurality of reading-circuit units to output electric signals in parallel, the electric signals being transmitted from the plurality of pixel groups.

Accordingly, the sensing operations can be performed in parallel through the plurality of reading-circuit units and the sensing operation can be performed at higher speed and frequency than in the case of the first embodiment, which further increases the precision of the sensing operation. For example, shifting the sensing operation performed by the first reading-circuit unit 103a from that performed by the second reading-circuit unit 103b by as much as half the cycle of the sensing operation allows for the reading circuit 103 to perform the sensing operation at an operation frequency twice as high as that of the first embodiment.

Here, the first reading-circuit unit 103a includes a first integrating amplifier 203a, a first sample-and-hold circuit 205a, a first multiplexer 208a, a first differential amplifier 209a, and a first A/D converter 210a. Further, the second reading-circuit unit 103b includes a second integrating amplifier 203b, a second sample-and-hold circuit 205b, a second multiplexer 208b, a second differential amplifier 209b, and a second A/D converter 210b.

Thirdly, the reading-circuit units include an odd row-signal sample-and-hold circuit, an even row-signal sample-and-hold circuit, an odd row-noise sample-and-hold circuit, and an even row-noise sample-and-hold circuit for the respective integrating amplifiers 203.

The odd row-signal sample-and-hold circuit includes a sampling switch SHOS sampling an electric signal transmitted from an odd-row pixel (hereinafter referred to as a pixel signal), and a sampling capacitance Chos holding the odd-row pixel signal. The even row-signal sample-and-hold circuit includes a sampling switch SHES sampling an even-row pixel signal, and a sampling capacitance Ches holding the even-row pixel signal.

The odd row-noise sample-and-hold circuit includes a sampling switch SHON sampling a noise component of the operational amplifier before sampling the odd-row pixel signal, and a sampling capacitance Chon holding the noise signal. The odd row-noise sample-and-hold circuit includes a sampling switch SHEN sampling a noise component of the operational amplifier before sampling the even-row pixel signal, and a sampling capacitance Chen holding the noise signal. That is, odd-row sample-and-hold circuits and even-row sample-and-hold circuits, each of which includes an image-signal sample-and-hold circuit and a noise-component sample-and-hold circuit, are provided.

Fourthly, the multiplexer 208 includes a switch MSOS provided for the odd row-signal sample-and-hold circuit and a switch MSES provided for the even row-signal sample-and-hold circuit for each of the amplifier circuits.

Further, the multiplexer 208 includes a switch MSON provided for the odd row-noise sample-and-hold circuit and a switch MSEN provided for the even row-noise sample-andhold circuit for each of the amplifier circuits. By selecting the switches in sequence, parallel signals of the pixel signals or the noise components are converted into serial signals.

Fifthly, the buffer amplifier 209 includes a signal buffer SFS, a reset switch SRS, a noise buffer SFN, a reset switch SRN, and a differential amplifier to eliminate an offset of the integrating amplifier.

Due to the third to fifth differences, electric signals transmitted from the pixels of a row which is driven after a specified row can be subjected to correlated double sampling and output to the reading-circuit unit during the time period where the offset-elimination operation and the parallel-to-serial conversion operation are performed for output signals generated based on electric signals transmitted from the pixels of the specified row.

Next, a reading operation performed according to the present embodiment will be described with reference to FIG. 6. FIG. 6 selectively illustrates the operations corresponding to operations that are performed after the accumulation operation illustrated in FIG. 4. Since a sensing operation performed according to the present embodiment during the accumulation operation is the same as that of the first embodiment, the detailed description thereof will not be furnished.

As is the case with the first embodiment, monitoring is performed through the sensing operation performed by the reading circuit 103, and the end of the radiation irradiation is sensed through the sensing operation. The reset switch is caused to enter the conductive state based on the end of the irradiation of radiation or light, the end being sensed by the sensing unit 106. The conductive state of the reset switch is continued until the reading operation is started. Accordingly, the time period where the signal wire is not connected to the fixed potential, the time period being included in the duration between the end of the radiation exposure and the start of the reading operation, can be reduced to appropriately suppress a cross talk occurring in that period.

As the reset switch is caused to enter the non-conductive state, the operation is shifted to the reading operation. The control unit 106 transmits a control signal to the sample-and-hold circuit, the sampling switch SHON of the odd row-noise sample-and-hold circuit is brought into conduction, and a noise component is transferred from the reset integrating amplifier 203 to the sampling capacitance Chon. The sampling switch SHON is brought into non-conduction and the noise component is held in the sampling capacitance Chon.

Next, the control signals D-CLK, DIO, and OE are supplied from the control unit 106 to the driving circuit 102, and supplied from the driving circuit 102 to the driving wire G1 of the first row so that the switch elements T11 to T18 of the first row are brought into conduction. Accordingly, analog electric signals that are generated based on electric charges generated in the conversion elements S11 to S14 of the first row are transferred in parallel from the pixels to the first reading circuit 103a via the signal wires Sig1 to Sig4.

Further, analog electric signals that are generated based on electric charges generated through the conversion elements S15 to S18 of the first row are transferred in parallel from the pixels to the second reading circuit 103b via the signal wires Sig5 to Sig8. Then, the control unit 106 transmits a control signal to the sample-and-hold circuit, the sampling switch SHOS of the odd row-signal sample-and-hold circuit is brought into conduction, and a read pixel signal is transferred to the sampling capacitance Chos via the amplifying circuit. At that time, a noise component is added to the pixel signal. Then, the sampling switch SHOS is brought into non-conduction and the pixel signal including the additional noise component is held in the sampling capacitance Chon.

After the pixel signal is held in the sampling capacitance Chon, the integrating capacitance and the signal wire are reset. After the resetting, the sampling switch SHEN of the even row-noise sample-and-hold circuit is brought into conduction as is the case with the first row, and a noise component is transferred from the reset integrating amplifier 203 to the sampling capacitance Chen. The conducting voltage Vcom is supplied to the driving wire G2 of the second row, and the switching elements T21 to T23 of the second row are caused to enter the conductive state. Within the time period where the switching elements T21 to T23 of the second row are in the conductive state, the multiplexer 208 outputs electric signals that are held in the odd-row sample-and-hold circuit in sequence.

Accordingly, the electric signals that are read in parallel from the pixels of the first row are converted into serial image signals and output. The A/D converter 210 converts the serial image signals into the image data corresponding to a single row and outputs the image data. The above-described operations are performed for each of the first to eighth rows so that the radiograph data corresponding to a single frame is output from the image-pickup apparatus 100. Namely, the present embodiment is different from the first embodiment in that the noise-component sampling operation is included in the reading operation, where the noise-component sampling operation is performed between the end of the conduction state of the reset switch and the start of driving the detecting unit 101, where the driving is performed by the driving circuit 102. The above-described operations allow for appropriately eliminating the noise component of the integrating amplifier 203 and acquiring radiograph data with a high S/N ratio.

On the other hand, the time elapsed between the end of the conductive state of the reset switch and the start of driving the detecting unit 101, the driving being performed by the driving circuit 102, becomes longer than that of the first embodiment. However, since the sampling operation is usually performed over a short time period of a few μs to a dozen or so μs including margins, a cross talk induced during the time period is insignificant and causes no problems in consideration of the time constant determined based on the signal wire and the coupling capacitance.

Third Embodiment

A third embodiment of the present invention, which is applied to movable radiation image-pickup apparatuses, will be described with reference to FIGS. 7A and 7B. FIG. 7A is a schematic diagram of a radiation image-pickup system including a portable radiation image-pickup apparatus capable of fluoroscopy and still-image shooting. In FIG. 7A, shooting is performed by removing the image-pickup apparatus 100 from a C-shaped arm 601 and using a radiation generator 607 provided on the C-shaped arm 601, for example. Here, the C-shaped arm 601 holds the radiation generator 607 and the image-pickup apparatus 100. A display unit 602 capable of displaying image data acquired through the image-pickup apparatus 100, and a bed 603 on which a subject 604 is placed are provided. Further, a carriage 605 rendering the radiation generator 206, the image-pickup apparatus 100, and the C-shaped arm 601 movable, and a movable control apparatus 606 that can control the above-described components are provided.

The control apparatus 606 including the control computer 108 can perform image processing for an image signal acquired through the image-pickup apparatus 100 and transfer the processed image signal to the display apparatus 602 or the like. Further, image data generated through the image processing performed by the control apparatus 606 can be transferred to a distant place through a transfer device such as a telephone line. Accordingly, the image data may be displayed on a display provided in a different place such as a doctor's room or stored in a storage device such as an optical disk, which allows for a doctor who is in the distance place to make a diagnosis. The transferred image data may also be recorded on a film through a film processor. Part of or the entire configuration of the control unit 106 according to an embodiment of the present invention may be provided in the image-pickup apparatus 100 or the control apparatus 606.

FIG. 7B is a schematic diagram of a radiation image-pickup system including a portable radiation image-pickup apparatus capable of fluoroscopy and still-image shooting. In FIG. 7B, shooting is performed by removing the image-pickup apparatus 100 from the C-shaped arm 601 and using a radiation generator 607' separate from the radiation generator 607 provided on the C-shaped arm 601, for example. As a matter of course, the control computer 108 according to an embodiment of the present invention can control not only the radiation generator 607, but also the separate radiation generator 607'. However, the present invention becomes increasingly advantageous when the control computer 108 controls the radiation generator 607' with delay or difficulty.

Further, another embodiment of the present invention may be achieved by a computer executing a program, for example. Further, a device supplying the program to the computer, such as a computer-readable storage medium including, for example, a CD-ROM storing the program, or a transfer medium such as the Internet through which the program is transferred may be applied according to another embodiment of the present invention. Further, the above-described program may be applied according to another embodiment of the present invention. The above-described program, storage medium, transfer medium, and a program product are within the scope of the present invention. Further, an invention achieved by combining the above-described embodiments in an easily imaginable manner is also within the scope of the present invention.

While the present invention has been described with reference to exemplary embodiments, it is to be understood that the invention is not limited to the disclosed exemplary embodiments. The scope of the following claims is to be accorded the broadest interpretation so as to encompass all such modifications and equivalent structures and functions.

This application claims the benefit of Japanese Patent Application No. 2010-260525 filed Nov. 22, 2010, which is hereby incorporated by reference herein in its entirety.

What is claimed is:

1. An image-pickup system comprising:
an image-pickup apparatus including a detector comprising a detecting unit and a reading circuit, the detecting unit being provided with pixels that are arranged in matrix-form, where each of the pixels includes a conversion element converting a radiation into an electric charge, the reading circuit including a connecting unit that is electrically connected to a signal wire transferring an electric signal corresponding to the electric charge and that electrically connects the signal wire to a node to which a specified potential is supplied, the reading circuit being provided to perform a reading operation to output the electric signal from the pixel, and a control unit configured to control an operation of the reading circuit; and
a sensing unit configured to sense an end of irradiation of a radiation based on an output of the reading circuit, the output being acquired during a time period where the detector performs an accumulation operation,
wherein the control unit controls the reading circuit so that the connecting unit starts establishing the electrical connection between the signal wire and the node based on the sensed end of the irradiation, and retains the electrical connection until the start of the reading operation.

2. The image-pickup system according to claim 1, wherein the control unit controls the reading circuit so that the reading circuit acquires an output signal or an output-data item of the reading circuit at a specified frequency during a time period where the radiation irradiation is performed.

3. The image-pickup system according to claim 1, wherein the sensing unit makes a comparison between a plurality of the output signals or the output-data items that are acquired consecutively.

4. The image-pickup system according to claim 1, wherein the pixel further includes a switching element outputting an electric signal corresponding to the electric charge,
wherein a plurality of the signal wires is electrically connected to a plurality of the switching elements that are arranged in a column direction, and is arranged in a row direction,
wherein the reading circuit further includes a plurality of amplifying circuits that are provided for a plurality of the signal wires, where each of the amplifying circuits includes an integrating amplifier having a reset switch and a sample-and-hold circuit which samples and temporarily holds an output signal of the integrating amplifier, and a multiplexer outputting electric signals that are read in parallel from the amplifier circuits in sequence as serial image signals, and
wherein the connecting unit includes the reset switches.

5. The image-pickup system according to claim 4, wherein the sample-and-hold circuit includes a signal sample-and-hold circuit that samples and temporarily holds an image signal, and a noise sample-and-hold circuit that samples and temporarily holds a noise component of the integrating amplifier, and
wherein the control unit controls the reading circuit so that the electrical connection between the signal wire and the node, the electrical connection being established by the reset switch, is retained from the end of the irradiation to the start of the noise-component sampling performed by the noise sample-and-hold circuit based on the sensed end of the irradiation.

6. The image-pickup system according to claim 5, wherein the signal sample-and-hold circuit is provided for each of an odd row and an even row, and the noise sample-and-hold circuit is provided for each of an odd row and an even row.

7. The image-pickup system according to claim 4, wherein, in the image-pickup apparatus, a plurality of driving wires which is electrically connected to the switching elements that are arranged in the row direction is arranged in the column direction,
wherein the image-pickup apparatus further includes a driving circuit driving the detecting unit by supplying a conducting voltage or a non-conducting voltage of the switching element to the driving wires in rows, and
wherein the control unit controls the reading circuit and the driving circuit to retain the electrical connection between the signal wire and the node, the electrical connection being established by the reset switch, from the end of the irradiation until the start of the driving of the detecting unit, the driving being performed by the driving circuit, based on the sensed end of the irradiation.

8. The image-pickup system according to claim 1, wherein the pixels of the detecting unit are divided into a plurality of pixel groups, and
wherein the reading circuit includes a plurality of reading-circuit units, and one of the reading-circuit units corresponds to one of the pixel groups and electric signals that are transmitted from the pixel groups are output in parallel by the reading-circuit units.

9. The image-pickup system according to claim 1, wherein the conversion element includes a photoelectric conversion element converting light into the electric charge and a wavelength converter converting a radiation into the light falling within a band of wavelengths that can be sensed by the photoelectric conversion element, or directly converts a radiation into the electric charge.

10. The image-pickup system according to claim 1, further comprising:
a radiation generator configured to irradiate the image-pickup apparatus with a radiation; and
a control apparatus configured to control the image-pickup apparatus and the radiation generator.

11. A method of controlling an image-pickup system including an image-pickup apparatus including a detector comprising a detecting unit and a reading circuit, the detecting unit being provided with pixels that are arranged in matrix-form, where each of the pixels includes a conversion element converting a radiation into an electric charge, the reading circuit including a connecting unit that is electrically connected to a signal wire transferring an electric signal corresponding to the electric charge and that electrically connects the signal wire to a node to which a specified potential is supplied, the reading circuit being provided to perform a reading operation to output the electric signal from the pixel, and a control unit configured to control an operation of the reading circuit, the method comprising the steps of:
sensing an end of radiation irradiation based on an output of the reading circuit, the output being acquired during a time period where the detector performs an accumulation operation, and
starting establishing the electrical connection between the signal wire and the node by the connecting unit based on the sensed end of the irradiation and retaining the electrical connection by the connecting unit until the start of the reading operation.

12. A non-transitory computer-readable storage medium storing thereon a computer-executable program which when executed on a computer causes the computer to control an image-pickup system, the image pickup system including a radiation image-pickup apparatus including a detector comprising a detecting unit and a reading circuit, the detecting unit being provided with pixels that are arranged in matrix-form, where each of the pixels includes a conversion element converting a radiation into an electric charge, the reading circuit including a connecting unit that is electrically connected to a signal wire transferring an electric signal corresponding to the electric charge and that electrically connects the signal wire to a node to which a specified potential is supplied, the reading circuit being provided to perform a reading operation to output the electric signal from the pixel, and a control unit configured to control an operation of the reading circuit, the program causing the computer to execute the steps of: sensing an end of radiation irradiation based on an output of the reading circuit, the output being acquired during a time period where the detector performs an accumulation operation, and starting establishing the electrical connection between the signal wire and the node by the connecting unit based on the sensed end of the irradiation and retaining the electrical connection by the connecting unit until the start of the reading operation.

* * * * *